(12) United States Patent
Mitchell et al.

(10) Patent No.: US 12,704,667 B2
(45) Date of Patent: Aug. 11, 2026

(54) BEAM COMBINING GRATING WITH INTEGRATED APODIZER

(71) Applicant: Raytheon Company, Waltham, MA (US)

(72) Inventors: Bradley A. Mitchell, Dallas, TX (US); Hannan S. Orrell, Van Alstyne, TX (US)

(73) Assignee: Raytheon Company, Arlington, VA (US)

( * ) Notice: Subject to any disclaimer, the term of this patent is extended or adjusted under 35 U.S.C. 154(b) by 285 days.

(21) Appl. No.: 18/491,392

(22) Filed: Oct. 20, 2023

(65) Prior Publication Data

US 2025/0130354 A1 Apr. 24, 2025

(51) Int. Cl.
*G02B 5/18* (2006.01)

(52) U.S. Cl.
CPC ......... *G02B 5/1861* (2013.01); *G02B 5/1814* (2013.01)

(58) Field of Classification Search
CPC ............ G01B 9/02038; G02B 27/1006; G02B 27/108; G02B 27/1086; G02B 27/123; G02B 27/144; G02B 27/145; G02B 6/02328; G02B 6/02347; G02B 6/02376; G02B 6/02385; G02B 6/3826; G02B 6/3853; G02B 27/64; G02B 6/26; G02B 6/34; G02B 6/42; G02B 2027/0174; G02B 27/0103; G02B 27/0172; G02B 27/143; G02B 5/1814; G02B 5/32; G02B 2027/0105; G02B 5/08; G02B 5/1861; G02B 6/02057; G02B 6/02076; G02B 5/1871; G02B 6/2931; G02B 27/0905; G02B 27/10; G02B 27/0944; H01S 3/0078; H01S 3/005; G03H 1/0248; G03H 2223/23
See application file for complete search history.

(56) References Cited

U.S. PATENT DOCUMENTS 6,259,055 B1 * 7/2001 Sokol .................. B23K 26/064 219/121.68
7,095,504 B1 * 8/2006 Ames ................. G01B 9/02038 356/486
7,099,086 B2 * 8/2006 Gutin .................. G02B 6/2931 359/569
8,472,763 B1 6/2013 Liu et al.
(Continued)

FOREIGN PATENT DOCUMENTS

DE 102018206679 A1 * 10/2019 ........... G02B 26/106
KR 101621431 B1 * 5/2016 ............. A45D 42/24

OTHER PUBLICATIONS

Thorlabs, "Apodizing Reflective ND Filters," Aug. 2023, 5 pages.
(Continued)

*Primary Examiner* — Matthew Y Lee

(57) ABSTRACT

An apparatus includes an optical surface configured to receive multiple input optical beams. The optical surface includes a grating configured to diffract first portions of the input optical beams in a first direction to form a combined optical beam. The grating is also configured to reflect second portions of the input optical beams in a second direction. The optical surface also includes a reflective surface at least partially surrounding the grating. The reflective surface is configured to reflect third portions of the input optical beams in the second direction.

20 Claims, 6 Drawing Sheets

(56) References Cited

U.S. PATENT DOCUMENTS

| | | | | |
|---|---|---|---|---|
| 10,935,727 | B2 * | 3/2021 | Sakurai | G02B 6/4298 |
| 2006/0163223 | A1 * | 7/2006 | Zhang | B23K 26/082 |
| | | | | 219/121.73 |
| 2007/0127123 | A1 | 6/2007 | Brown et al. | |
| 2023/0296860 | A1 * | 9/2023 | Sauvageot | G02B 7/181 |
| | | | | 359/845 |

OTHER PUBLICATIONS

Blumberg, "WATCH: Those Little Black Dots on Your Windshield Actually Have a Purpose," Southern Living, Oct. 2018, 2 pages.

International Search Report and Written Opinion of the International Searching Authority dated Oct. 31, 2024 in connection with International Patent Application No. PCT/US2024/039850, 20 pages.

Auerbach et al., "Serrated-Aperture Apodizers For High-Energy Laser Systems", Applied Optics, vol. 33, Issue 15, May 1994, 5 pages.

* cited by examiner

BEAM COMBINING GRATING WITH INTEGRATED APODIZER

TECHNICAL FIELD

This disclosure relates generally to optical systems. More specifically, this disclosure relates to a beam combining grating with an integrated apodizer.

BACKGROUND

Optical systems often suffer from a number of issues that can affect the focus of the optical systems. One example of such an issue is the creation of an "Airy pattern," which refers to a pattern having a brighter central spot of illumination surrounded by concentric rings of dimmer illumination around the central spot. An Airy pattern is typically created when substantially uniform illumination passes through an aperture and experiences diffraction. The creation of an Airy pattern can degrade an optical beam passing through the aperture, and this degradation can impact the use of the optical beam.

SUMMARY

This disclosure relates to a beam combining grating with an integrated apodizer.

In a first embodiment, an apparatus includes an optical surface configured to receive multiple input optical beams. The optical surface includes a grating configured to diffract first portions of the input optical beams in a first direction to form a combined optical beam. The grating is also configured to reflect second portions of the input optical beams in a second direction. The optical surface also includes a reflective surface at least partially surrounding the grating. The reflective surface is configured to reflect third portions of the input optical beams in the second direction.

In a second embodiment, a system includes an optical device having an optical surface configured to receive multiple input optical beams. The optical surface includes a grating configured to diffract first portions of the input optical beams in a first direction to form a combined optical beam. The grating is also configured to reflect second portions of the input optical beams in a second direction. The optical surface also includes a reflective surface at least partially surrounding the grating. The reflective surface is configured to reflect third portions of the input optical beams in the second direction. The system also includes a beam dump configured to terminate the second and third portions of the input optical beams.

In a third embodiment, a method includes receiving multiple input optical beams at an optical surface. The method also includes, using a grating of the optical surface, diffracting first portions of the input optical beams in a first direction to form a combined optical beam and reflecting second portions of the input optical beams in a second direction. In addition, the method includes, using a reflective surface of the optical surface that at least partially surrounds the grating, reflecting third portions of the input optical beams in the second direction.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
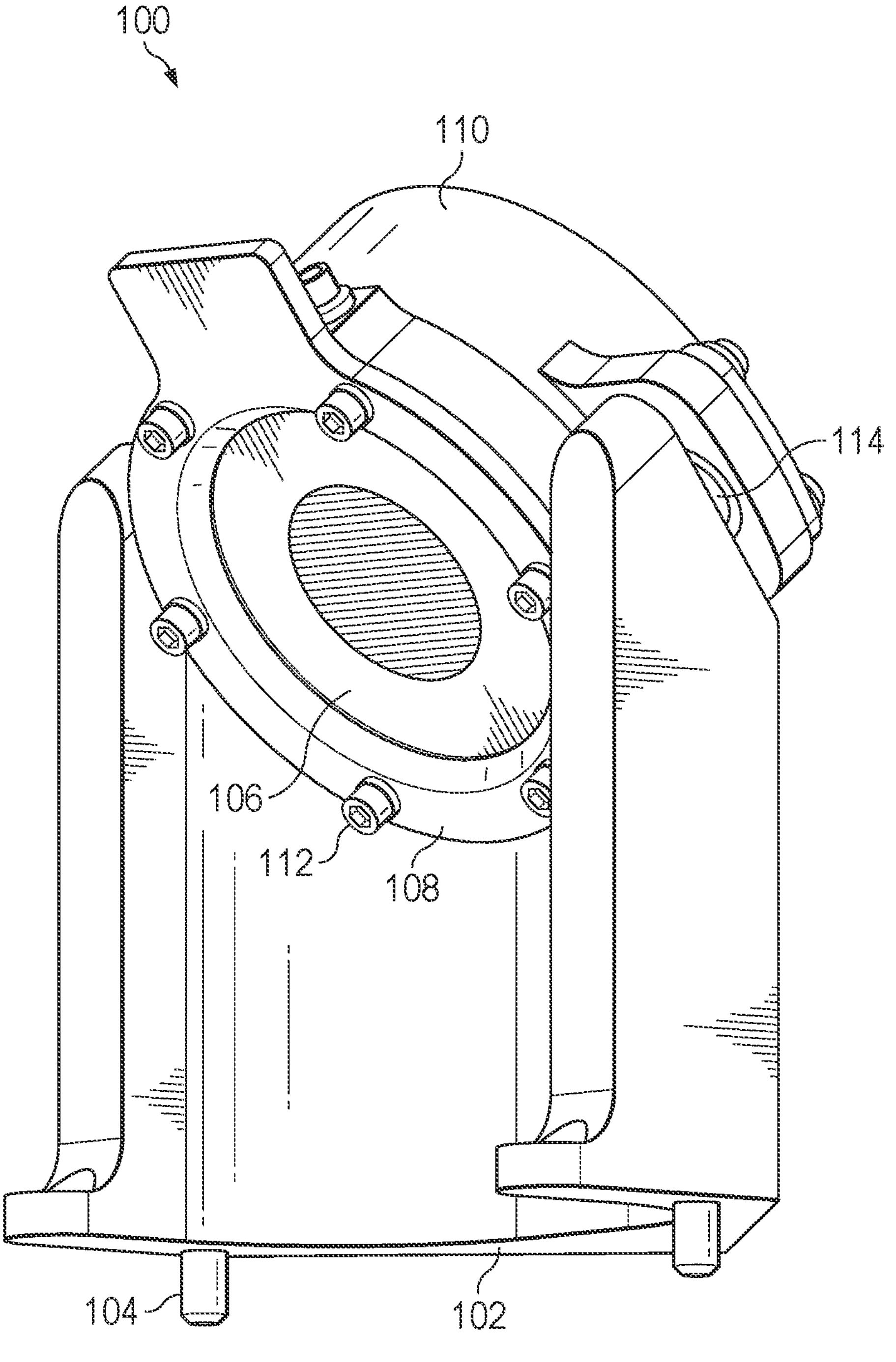
FIGS. 1 and 2 illustrate an example optical device having a beam combining grating with an integrated apodizer according to this disclosure.

FIGS. 1 through 5, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, optical systems often suffer from a number of issues that can affect the focus of the optical systems. One example of such an issue is the creation of an "Airy pattern," which refers to a pattern having a brighter central spot of illumination surrounded by concentric rings of dimmer illumination around the central spot. An Airy pattern is typically created when substantially uniform illumination passes through an aperture and experiences diffraction. The creation of an Airy pattern can degrade an optical beam passing through the aperture, and this degradation can impact the use of the optical beam. "Apodization" refers to the process of changing the shape of the intensity profile of an optical beam in an optical system. Among other things, apodization can be used to remove the concentric rings of dimmer illumination around the central spot in an Airy pattern.

Current optical systems often use hard-edge optics that define apertures through which optical beams pass, where the hard-edge optics are used to scrape and apodize the optical beams. While this approach is effective for single-beam systems, it is more difficult to use this approach in multi-beam systems. For example, some multi-beam systems generate multiple optical beams and then combine the optical beams in order to generate higher-power output beams. These multi-beam systems use one component to combine the optical beams and another component to scrape and apodize the combined beams, and each component typically requires its own dedicated beam dump to terminate optical energy. Thus, while this does work, it requires the use of a number of components, which increases the size, weight, and cost of the overall system. This can also make it more difficult to properly align the multiple optical beams being combined and apodized, and it generally increases the complexity of the overall system. Further, this can limit the amount of power that can be achieved in the combined beams generated by the overall systems. In addition, as the number of components and the number of their associated surfaces increase, it becomes harder to provide safety in laser systems and other systems involving high-power optical beams (since this increases the chances of optical energy being redirected in an undesirable manner).

This disclosure provides a beam combining grating with an integrated apodizer. As described in more detail below, an optical device includes a grating that is at least partially surrounded by a reflective surface. Depending on the implementation, the grating and the reflective surface may be formed as an integrated structure, or the grating and the reflective surface may be formed as separate structures that are connected to each other or that are otherwise used together. As a particular example of the latter, the grating and the reflective surface may be formed as separate structures, and the reflective surface may be overlaid onto the grating.

The grating is configured to combine optical energy from multiple input optical beams in order to generate a combined optical beam. Among other things, this allows the grating to combine multiple input optical beams from multiple sources into a single higher-power combined optical beam. In some cases, the input optical beams can have different wavelengths, and the grating can be used to produce a spectrally-combined and coherent combined optical beam. The reflective surface reflects unwanted portions of the input optical beams towards a beam dump for termination. Among other things, this allows the reflective surface to reject unwanted portions of a beam profile, while the grating can be used to propagate desired combined optical energy within desired portions of the beam profile. Note that some optical energy from the grating can also be directed towards the same beam dump for termination.

In this way, the optical device is able to perform both (i) combination of wanted portions of multiple input optical beams in order to generate a combined optical beam and (ii) rejection of unwanted portions of the multiple input optical beams. As a result, the optical device supports the use of a beam combining grating with an integrated apodizer. Because the beam combination and apodization functions can be performed by the same optical device, this can reduce the number of components in an overall system, thereby reducing the size, weight, and cost of the overall system. As particular examples, this can eliminate the need to use a separate apodizer downstream from a beam combiner, and this can reduce the number of beam dumps needed in the overall system (since a beam combiner and a separate apodizer each needs its own beam dump). Also or alternatively, the space saved by not including a separate apodizer and its beam dump may be used for one or more other components and/or achieve a more compact design. As a specific example, a device for reducing the incoming angle of the input optical beams onto the grating might be used, which would make the spread of incoming light tighter. As a result, fewer dielectric coating layers may be needed to reflect the incoming light, which can provide higher reflectivity and substantially-improved beam quality. Further, this can make it easier to properly align the multiple input optical beams being combined and generally reduce the complexity of the overall system, and this can increase the amount of power that can be achieved in the combined beam generated by the overall system. In addition, since the number of components and their associated surfaces can be lowered, it becomes simpler to provide safety in a laser system or other system by reducing the number of components from which a high-power optical beam might be reflected or by otherwise reducing the likelihood of the high-power optical beam being redirected in an undesirable manner.

The described optical device with the beam combining grating and the integrated apodizer may find use in any number of commercial, defense-related, or other applications. For example, the described optical device may be used in various optical systems that use high-energy lasers. As particular examples, the described optical device may be used in planes, jets, drones, helicopters, or other fight vehicles or in ground-based or sea-based platforms to direct high-energy laser beams at intended targets. As another particular example, the described optical device may be used in laser welding equipment or industrial equipment that uses lasers to weld components, cut objects, or perform other functions. In general, the described optical device is not limited to any specific application or use case.

Figure 2:
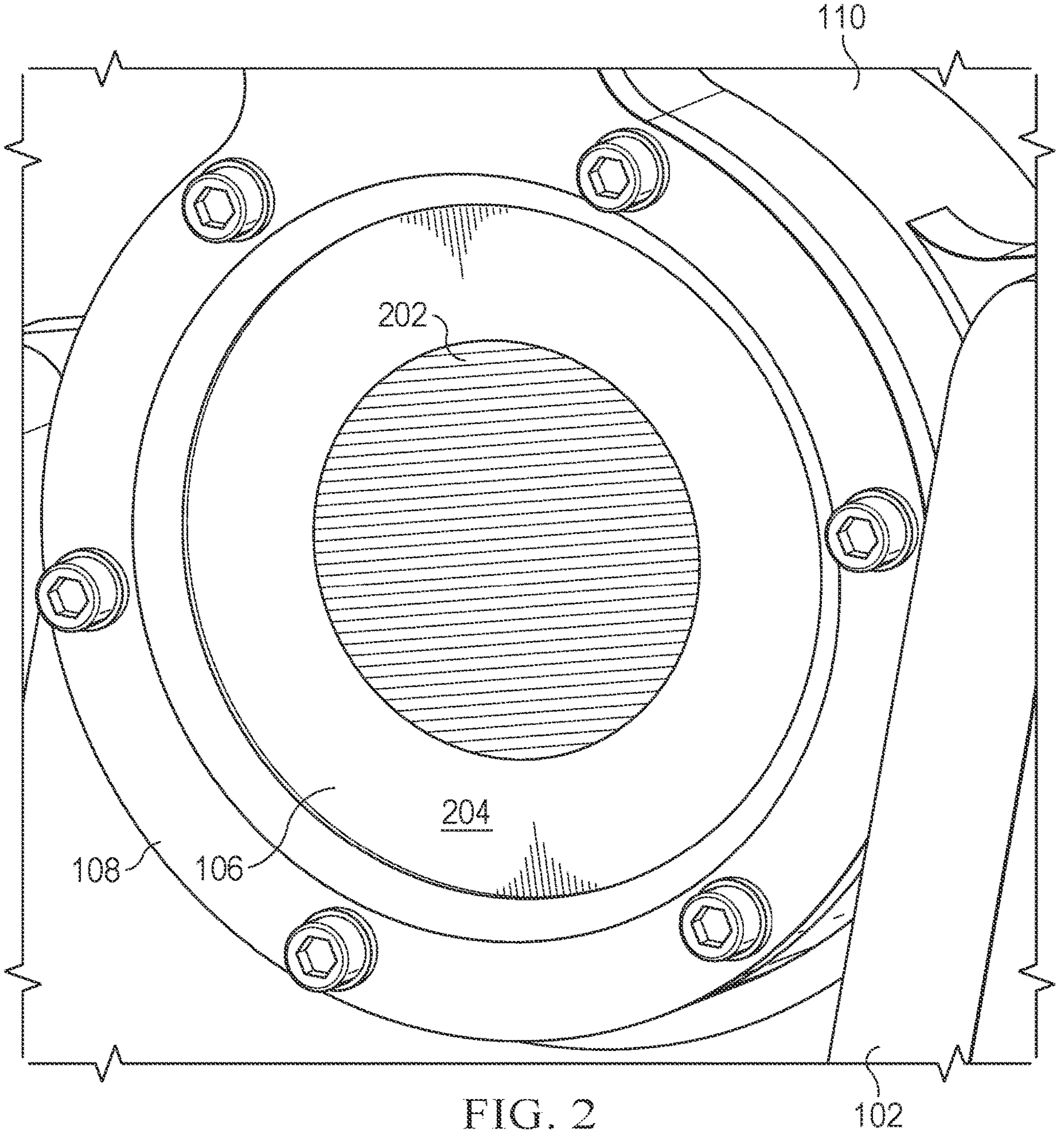

FIGS. 1 and 2 illustrate an example optical device 100 having a beam combining grating with an integrated apodizer according to this disclosure. As shown in FIG. 1, the optical device 100 generally includes a housing 102, which can be mounted on or otherwise connected to an external structure in order to secure the optical device 100 in place. The housing 102 can also support or protect other components of the optical device 100. The housing 102 can be formed from any suitable material(s), such as one or more metals, and in any suitable manner. The housing 102 can also have any suitable size, shape, and dimensions. In this particular example, the housing 102 is somewhat cylindrical with top and bottom openings and with an opening in the side of the housing 102. However, the housing 102 may have any other suitable form. In addition, the housing 102 in this example includes posts 104, which may represent threaded structures or other structures that can be used to secure the housing 102 to an external structure. However, this is for illustration only, and the housing 102 may be attached to an external structure in any other suitable manner or formed integral with the external structure.

The optical device 100 also includes an optical surface 106, which is used to combine multiple input optical beams and generate a combined optical beam while also redirecting unwanted portions of the input optical beams. As described in more detail below, the optical surface 106 includes a grating that combines the input optical beams via diffraction and generates the combined optical beam, as well as a reflective surface that redirects some unwanted portions of the input optical beams. One specific example implementation of the optical surface 106 is shown in FIG. 2, which is described below.

In this example, the optical surface 106 is secured in place between a cover 108 and a base 110 of the optical device 100. The cover 108 includes an opening that allows the optical surface 106 to remain exposed. The cover 108 can be formed from any suitable material(s), such as one or more metals, and in any suitable manner. The cover 108 can also have any suitable size, shape, and dimensions. In this particular example, the cover 108 is generally annular with a large projection that can serve as a handle in some cases. However, the cover 108 may have any other suitable form. In addition, the cover 108 in this example includes openings that allow posts (such as threaded structures or other structures) from the base 110 to pass through the cover 108, where nuts 112 can be secured to the posts. However, this is for illustration only, and the cover 108 may be attached to the base 110 in any other suitable manner.

The base 110 can be secured to the housing 102 and used to hold the optical surface 106 in place and at a desired orientation. The base 110 can be formed from any suitable material(s), such as one or more metals, and in any suitable manner. The base 110 can also have any suitable size, shape, and dimensions. In this particular example, the base 110 is generally cylindrical with large projections used to attach the base 110 to the housing 102. However, the base 110 may have any other suitable form. In addition, the top of the housing 102 in this example is angled, and projections 114 extending from the angled top of the housing 102 can be inserted into corresponding openings in the projections of the base 110 in order to secure the base 110 to the housing 102. However, this is for illustration only, and the base 110 may be attached to the housing 102 in any other suitable manner or formed integral with the housing 102.

As shown in FIG. 2, the optical surface 106 of the optical device 100 includes a grating 202 and a reflective surface 204. The grating 202 is configured to diffract portions of input optical beams in order to combine those portions of the input optical beams. For example, the grating 202 can represent a diffraction grating that has a periodic structure. The periodic structure of the grating 202 causes optical energy in different input optical beams to split or diffract and travel in different directions from the grating 202. The splitting or diffracting of each input optical beam is dependent (at least in part) on the wavelength of the optical energy in the input optical beam and the direction at which the input optical beam reaches the grating 202. This feature of the grating 202 can be used to combine portions of the input optical beams in order to produce a combined optical beam.

Since the diffraction of different input optical beams can vary based on the wavelengths of the optical energy in the input optical beams and the directions that the input optical beams reach the grating 202, this feature can be used to select or control how the input optical beams are processed prior to reaching the grating 202. For example, the wavelength and direction of each input optical beam can be selected or controlled so that most optical energy from all of the input optical beam diffracts from the grating 202 in the same direction. Because the input optical beams can arrive at the grating 202 from slightly different directions, the wavelengths of the input optical beams can be selected so that the diffracted optical energy from the input optical beams leaves the grating 202 in the same direction. In this way, the grating 202 combines most of the optical energy from all of the input optical beams to produce a combined optical beam having a higher power or energy than the input optical beams individually.

The reflective surface 204 at least partially surrounds the grating 202. The reflective surface 204 is configured to reflect optical energy contained in the input optical beams without diffraction. This allows the reflective surface 204 to redirect those portions of the input optical beams to a beam dump for termination. Among other things, the reflective surface 204 can be used to redirect undesired portions of the input optical beams away from the combined optical beam, thereby helping to avoid the creation of an Airy pattern or causing other issues.

As described below, when input optical beams are incident on the optical surface 106, the grating 202 will diffract portions of the input optical beams so that those portions of the input optical beams combine and form a combined optical beam. Other portions of the input optical beams (often referred to as "zeroth-order" beams) will reflect from the grating 202. The reflective surface 204 will also reflect additional portions of the input optical beams. The reflected portions of the input optical beams (from the grating 202 and from the reflective surface 204) can be provided to a common beam dump for termination.

The grating 202 may have any suitable size, shape, and dimensions. In this example, the grating 202 is generally circular. However, the grating 202 may be elliptical or have any other suitable arbitrary shape. The shape of the grating 202 generally represents the apodization pattern applied to the input optical beams. The reflective surface 204 may also have any suitable size, shape, and dimensions. In this example, the reflective surface 204 is generally annular and completely surrounds the grating 202. However, the reflective surface 204 may have any other suitable arbitrary shape.

The grating 202 and the reflective surface 204 can each be formed from any suitable material(s) and in any suitable manner. For example, in some embodiments, the reflective surface 204 may be formed using one or more metals (such as gold), one or more dielectric coatings, or other material or materials having high reflectivity. Also, in some embodiments, the grating 202 may be formed using one or more metals (such as gold) or other material or materials that are etched or otherwise formed or processed to create a desired diffraction pattern. The grating 202 and the reflective surface 204 can be fabricated as an integral structure or fabricated separately and used together in the optical device 100. For instance, in some cases, one or more reflective materials may be deposited on a substrate and processed, where the reflective material(s) can be patterned or otherwise processed to form the grating 202 and polished or otherwise processed to form the reflective surface 204. In other cases, the grating 202 and the reflective surface 204 can be fabricated as separate components, and the reflective surface 204 can be placed over the grating 202 (or vice versa) prior to being secured to the base 110 by the cover 108.

Note that in this example, there is a well-defined boundary of the grating 202 relative to the reflective surface 204. This may be common, for example, when the reflective surface 204 is formed as a separate structure and includes an opening that allows a portion of the grating 202 to remain exposed. However, this type of boundary is not necessarily required, and other boundaries may exist between the grating 202 relative to the reflective surface 204. For instance, there may be a more gradual transition between the grating 202 and the reflective surface 204, such as when the reflectivity of the outer portion of the grating 202 gradually or rapidly increases until the reflective surface 204 is formed having the highest reflectivity. As another example, the boundary of the grating 202 relative to the reflective surface 204 may not be smooth, such as when the boundary between the grating 202 and the reflective surface 204 is serrated. Effectively, the boundary between the grating 202 and the reflective surface 204 defines the shape of an integrated apodizer within the optical device 100.

Although FIGS. 1 and 2 illustrate one example of an optical device 100 having a beam combining grating with an integrated apodizer, various changes may be made to FIGS. 1 and 2. For example, the sizes, shapes, and dimensions of the optical device 100 and its individual components can vary depending on the implementation. Also, the optical surface 106 of the optical device 100 can vary in any number of ways as described above. In general, the optical surface 106 of the optical device 100 can include a grating and a reflective surface, where the grating diffracts input optical beams to produce a combined optical beam and the reflective surface reflects unwanted portions of the input optical beams in order to function as an integrated apodizer.

Figure 3:
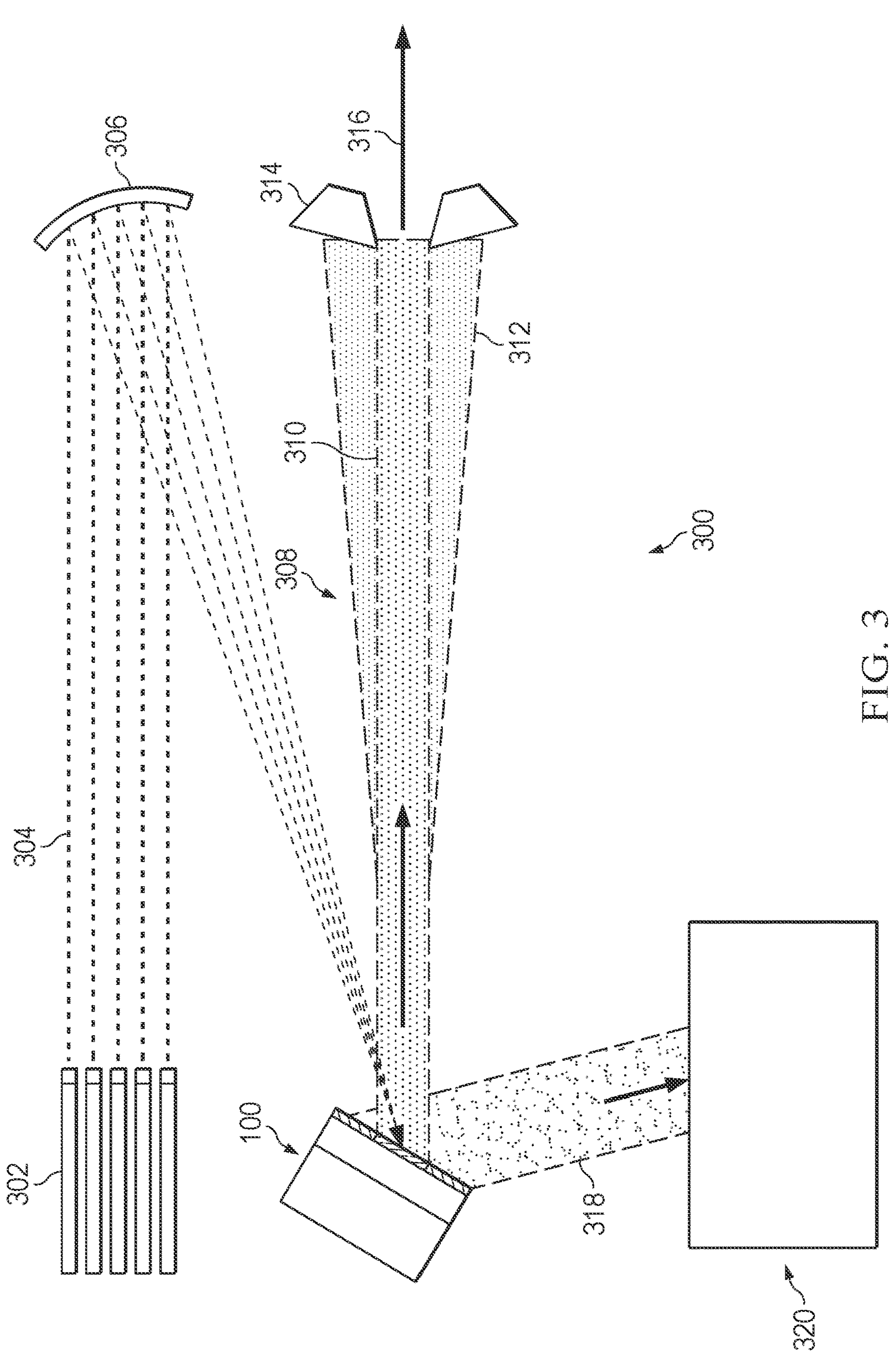
FIG. 3 illustrates an example system that uses an optical device having a beam combining grating with an integrated apodizer according to this disclosure.

FIG. 3 illustrates an example system 300 that uses an optical device 100 having a beam combining grating with an integrated apodizer according to this disclosure. As shown in FIG. 3, the system 300 includes a number of optical fibers 302, which are used to transport and provide input optical beams 304. For example, the optical fibers 302 can represent waveguides that transport the input optical beams 304 from one or more lasers or other optical sources. In some cases, the optical fibers 302 may have a spacing that is substantially equal. Each optical fiber 302 represents any suitable waveguide configured to transport one or more optical beams. The input optical beams 304 represent optical beams containing optical energy, where at least some of the input optical beams 304 have different wavelengths. Each input optical beam 304 can represent a collimated beam of light that is diverging somewhat as it moves away from its associated optical fiber 302.

In some embodiments, the system 300 also includes at least one transform optic 306, which may be transmissive or reflective. In some cases, the transform optic 306 may be implemented as a mirror, lens, or a prism. In the example illustrated in FIG. 3 and discussed below, the transform optic 306 is implemented using a mirror. However, in other embodiments, the transform optic 306 may be implemented as a transmissive optical element, which may include elements such as biconvex focusing optics. The mirror here reflects the input optical beams 304 towards the optical device 100. More specifically, the mirror can direct the input optical beams 304 onto a common portion of the optical surface 106 of the optical device 100. Ideally, the mirror directs the input optical beams 304 primarily onto the grating 202, while one or more portions of at least some of the input optical beams 304 may be directed onto the reflective surface 204. The mirror represents any suitable reflective structure configured to reflect input optical beams 304 onto one or more common portions of an optical device, such as an off-axis parabolic mirror having a set focus.

As can be seen in FIG. 3 in exaggerated form, different input optical beams 304 strike the optical device 100 at different angles. Due to the different wavelengths of the input optical beams 304 and the diffractive nature of the grating 202, portions of the input optical beams 304 can diffract from the grating 202 in a common direction and form a combined optical beam 308. The combined optical beam 308 generally includes a central portion 310 containing the vast majority of the optical energy of the combined optical beam 308, along with one or more regions 312 that may contain much smaller amounts of optical energy. The optical energy in the one or more regions 312 may include off-axis optical energy and amplified spontaneous emissions (ASE), which in some cases may account for less than one percent of the total optical energy of the input optical beams 304. In this example embodiment, the combined optical beam 308 passes through an exit scraper 314, which represents a structure defining an aperture through which the central portion 310 of the combined optical beam 308 can pass while absorbing or otherwise terminating the one or more regions 312 of the combined optical beam 308. This results in the generation of an output beam 316 that is generally of high quality. The output beam 316 can be provided to a beam director or other structure that directs the output beam 316 in one or more desired directions.

Additional portions 318 of the input optical beans 304 are reflected from the optical device 100 and directed towards a beam dump 320. For example, the zeroth-order beams representing the portions of the input optical beams 304 reflected from the grating 202 can be directed towards the beam dump 320, along with any portions of the input optical beams 304 reflected by the reflective surface 204. The beam dump 320 can absorb or otherwise terminate the received optical energy, thereby preventing that optical energy from causing injury or damage. In some cases, the beam dump 320 may be used to absorb a relatively small amount of optical energy in the system 300. As a particular example, in some embodiments, the beam dump 320 may absorb less than about 2.5% of the total optical energy contained in the input optical beams 304. The beam dump 320 includes any suitable structure configured to terminate optical energy.

Note that, in some embodiments, the optical device 100 may be coupled to an X-Y mechanical alignment device, such as a device that can move the optical device 100 along two orthogonal axes. This may allow the mechanical alignment device to adjust the position of the optical device 100 so that the grating 202 is centered at a desired location. Also note that the optical device 100 here may incorporate a cooling mechanism if needed or desired, such as a passive cooling mechanism or a fluid or other active cooling mechanism. Among other things, the reflective surface 204 (particularly when fabricated using one or more metals or other material(s) having high thermal conductivity) may pull thermal energy away from the grating 202 during operation Since the grating 202 is ideally where the bulk of optical energy strikes the optical device 100 during normal operation, this may allow the reflective surface 204 to effectively function as a heat sink. Assuming the base 110 or other component(s) of the optical device 100 can adequately pull thermal energy from the reflective surface 204, there may be little or no need for active cooling of the optical device 100. Of course, any suitable active or passive cooling technique or techniques may be used here to provide adequate thermal protection for the optical device 100.

In addition, note that the number of input optical beams 304 here can vary depending on the circumstances, such as based on how much optical energy is needed or desired in the output beam 316. In some cases, for instance, the system 300 may receive and combine a large number of input optical beams 304. In some embodiments, all of the various input optical beams 304 can be aligned with one another as follows. A near-field camera can be directed towards the optical surface 106 and positioned/oriented so that the grating 202 appears substantially circular (assuming the grating 202 is circular). Each individual input optical beam 304 can be roughly aligned to the center of the grating 202 (such as to within ±2 millimeters of the center of the grating 202). After that, one of the individual input optical beams 304 can be selected as a reference channel, and each of the other individual input optical beams 304 can be aligned in both the X and Y directions with the reference channel (such as to within ±0.05 microns of the input optical beam 304 forming the reference channel). This can represent a significantly-simplified alignment technique compared to other systems, which often require more-complex alignment techniques due to the presence of additional components within the systems. This can also help to reduce the risk of misalignment developing over the lifetime of the system 300.

Although FIG. 3 illustrates one example of a system 300 that uses an optical device 100 having a beam combining grating with an integrated apodizer, various changes may be made to FIG. 3. For example, the optical device 100 may be used in any other suitable system to combine optical beams via diffraction and to provide unwanted portions of the optical beams to a beam dump via reflection.

Figure 4A:
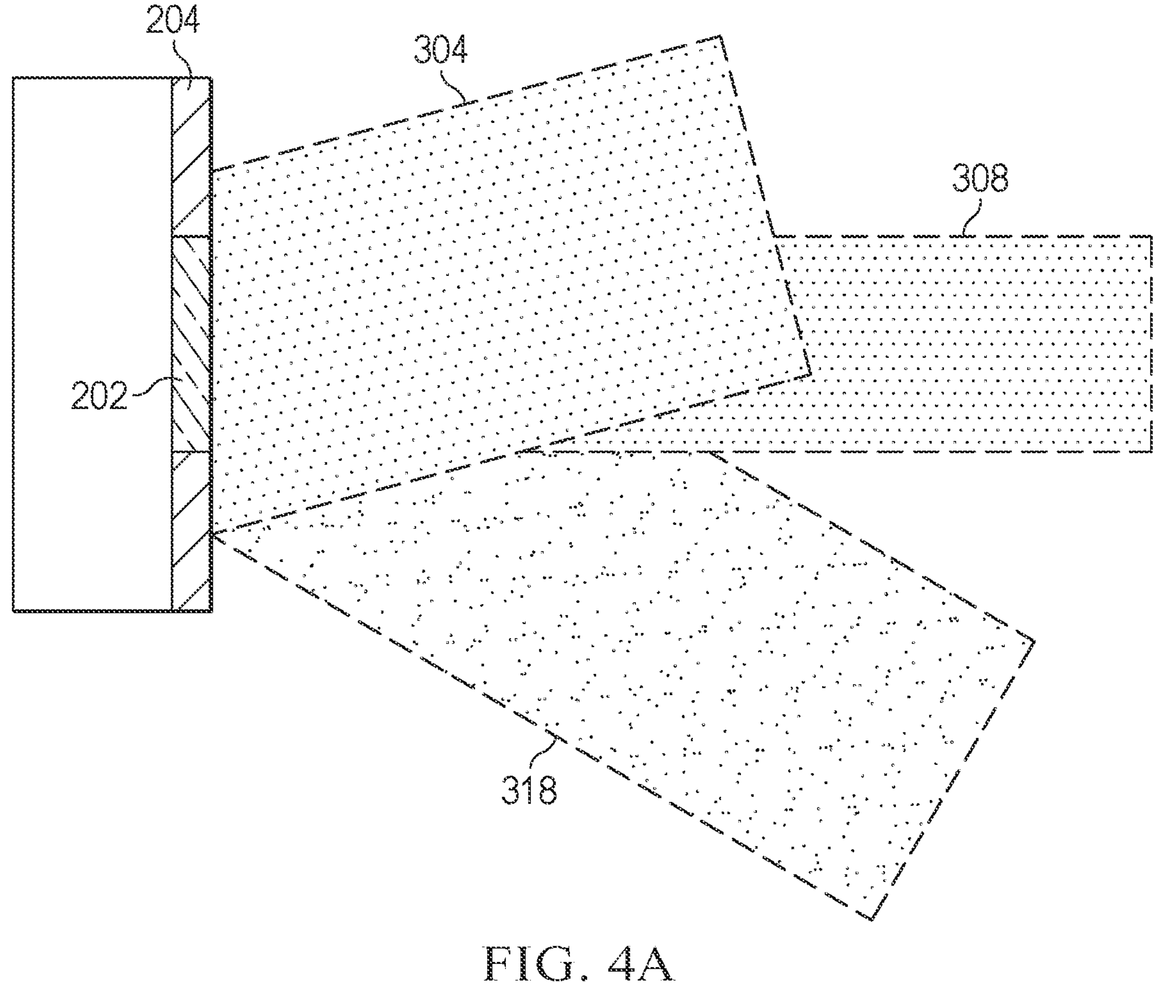
FIGS. 4A and 4B illustrate example operations of an optical device having a beam combining grating with an integrated apodizer and a beam dump according to this disclosure.
Figure 4B:
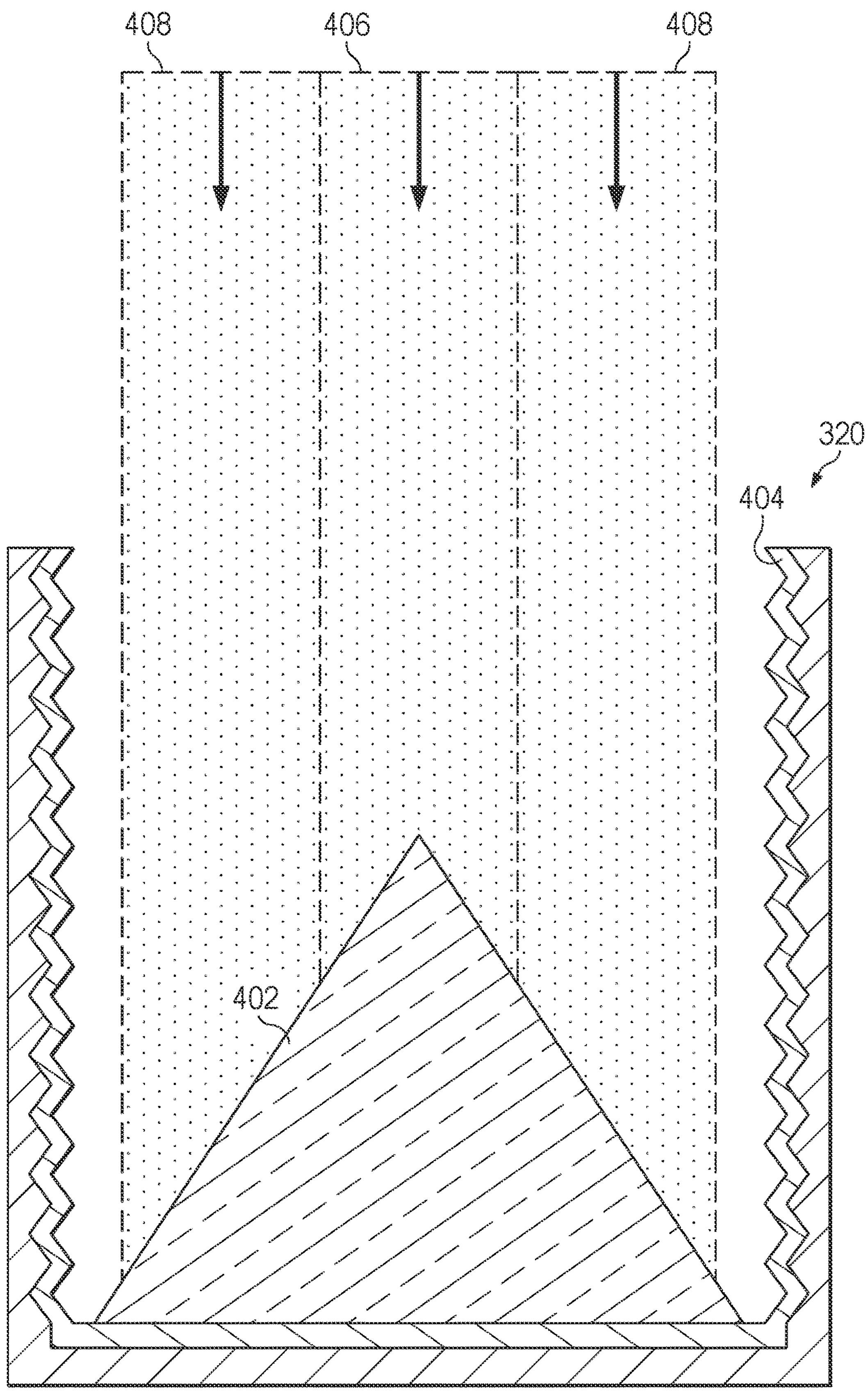

FIGS. 4A and 4B illustrate example operations of an optical device 100 having a beam combining grating with an integrated apodizer and a beam dump 320 according to this disclosure. As shown in FIG. 4A, the optical device 100 here receives the incoming input optical beams 304, and the grating 202 diffracts portions of the input optical beams 304 in a first common direction to collectively form the combined optical beam 308. Additional portions 318 of the input optical beams 304 reflect from the grating 202 and from the reflective surface 204 of the optical device 100, and these portions 318 are directed in a second common direction towards the beam dump 320. Depending on the implementation, the optical device 100 may or may not be actively cooled during operation in FIG. 4A.

As shown in FIG. 4B, the beam dump 320 may be implemented using a reflective structure 402 surrounded by one or more absorbing walls 404, such as when the one or more absorbing walls 404 form a circular or other enclosure laterally surrounding the reflective structure 402. The reflective structure 402 may represent a cone or other structure formed of one or more reflective materials, such as one or more metals like gold. Optical energy striking the reflective structure 402 is redirected towards the one or more absorbing walls 404, which can absorb and terminate the optical energy. The one or more absorbing walls 404 may optionally be fluid-cooled or otherwise actively or passively cooled in order to remove thermal energy from the one or more absorbing walls 404. The one or more absorbing walls 404 here may include sections that are angled in order to increase the surface area of the absorbing wall(s) 404.

In this example, optical energy 406 may primarily represent or include the zeroth-order beams reflected from the grating 202, while optical energy 408 (which may annularly surround the optical energy 406 in some cases) may primarily represent or include the portions of the input optical beams reflected from the reflective surface 204. In some embodiments, the optical energies 406, 408 can be distributed relatively evenly over the surface(s) of the reflective structure 402, which can help to avoid the creation of extreme hot spots that might damage the reflective structure 402. Also, since all waste optical energy is being provided to a common beam dump 320, this may allow more accurate power measurements associated with the optical energies 406, 408 to be captured.

Although FIGS. 4A and 4B illustrate examples of operations of an optical device 100 having a bear combining grating with an integrated apodizer and a beam dump 320, various changes may be made to FIGS. 4A and 4B. For example, the angles of incidence of the various bears on the reflective surface 204 as shown in FIG. 4A are for illustration only and can vary as needed or desired. Also, the beam dump 320 may have any other suitable form and need not have the specific design shown in FIG. 4B.

Figure 5:
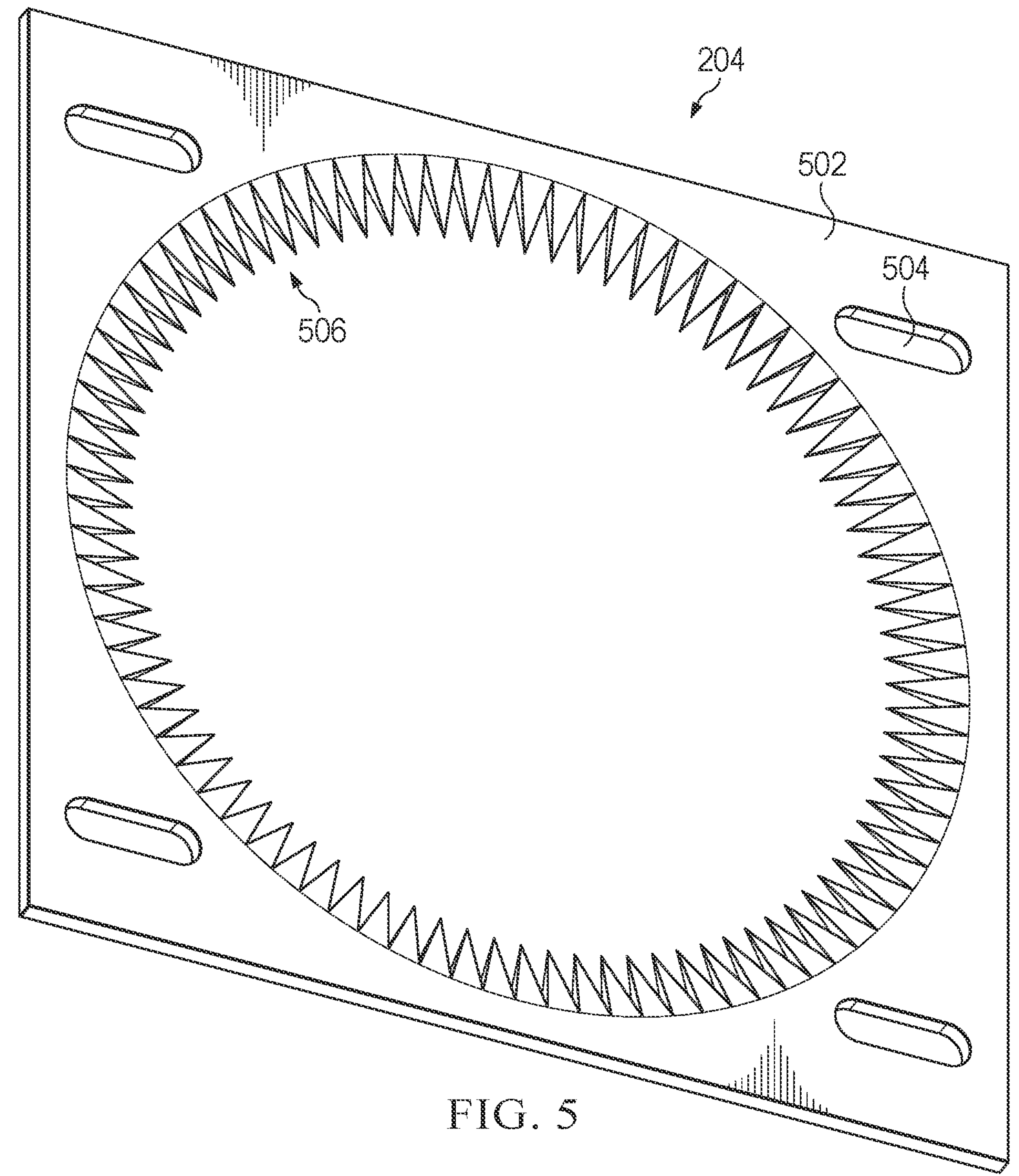
FIG. 5 illustrates an example reflective surface for use in an optical device having a beam combining grating with an integrated apodizer according to this disclosure.

FIG. 5 illustrates an example reflective surface 204 for use in an optical device 100 having a beam combining grating with an integrated apodizer according to this disclosure. In this example, it is assumed that the reflective surface 204 is formed separate from a grating 202, and the reflective surface 204 is positioned over the grating 202. As shown in FIG. 5, the reflective surface 204 is formed as a plate 502 having various slots 504. The plate 502 is designed to be positioned over the grating 202, and the slots 504 allow posts from the base 110 to pass through the plate 502 and through the cover 108 (which can be secured to the posts in order to hold the plate 502 in place over the grating 202).

In this example, the reflective surface 204 may define a non-circular opening 506 that functions as an apodizer. That is, the opening 506 of the reflective surface 204 here need not define a smooth boundary. The opening 506 of the reflective surface 204 may have various profiles or shapes. In this particular example, the opening 506 has a serrated design and boundary profile as illustrated. In other embodiments, the opening 506 may have a sinusoidal profile or any other suitable shapes or boundary profiles. In some embodiments, the number of serrations or other periodic or other changes in the boundary profile of the opening 506 may vary depending on the desired far-field profile of the output beam 316 for a given application. For instance, the selection of the number of serrations or other periodic or other changes in the boundary profile of the opening 506 may help in reducing higher-order wavefront aberrations in the far field of the output beam 316. Among other things, the use of serrations or other periodic or other changes in the boundary profile of the opening 506 may help to increase the amount of optical energy present in the center of an illumination pattern on a far-field target, which can be desirable in various applications.

Although FIG. 5 illustrates one example of a reflective surface 204 for use in an optical device 100 having a beam combining grating with an integrated apodizer, various changes may be made to FIG. 5. For example, the reflective surface 204 may include any number of serrations or other periodic or other changes to the boundary profile of the opening 506.

The following describes example embodiments of this disclosure that implement or relate to a beam combining grating with an integrated apodizer. However, other embodiments may be used in accordance with the teachings of this disclosure.

In a first embodiment, an apparatus includes an optical surface configured to receive multiple input optical beams. The optical surface includes a grating configured to diffract first portions of the input optical beams in a first direction to form a combined optical beam. The grating is also configured to reflect second portions of the input optical beams in a second direction. The optical surface also includes a reflective surface at least partially surrounding the grating. The reflective surface is configured to reflect third portions of the input optical beams in the second direction.

In a second embodiment, a system includes an optical device having an optical surface configured to receive multiple input optical beans. The optical surface includes a grating configured to diffract first portions of the input optical beams in a first direction to form a combined optical bean. The grating is also configured to reflect second portions of the input optical beams in a second direction. The optical surface also includes a reflective surface at least partially surrounding the grating. The reflective surface is configured to reflect third portions of the input optical beams in the second direction. The system also includes a beam dump configured to terminate the second and third portions of the input optical beams.

In a third embodiment, a method includes receiving multiple input optical beams at an optical surface. The method also includes, using a grating of the optical surface, diffracting first portions of the input optical beams in a first direction to form a combined optical beam and reflecting second portions of the input optical beams in a second direction. In addition, the method includes, using a reflective surface of the optical surface that at least partially surrounds the grating, reflecting third portions of the input optical beams in the second direction.

Any single one or any suitable combination of the following features may be used with the first, second, or third embodiment. The reflective surface may be configured to function as an apodizer to remove one or more unwanted portions of the input optical beams from the combined optical beam. The grating and the reflective surface may form an integral structure. The grating and the reflective surface may include separate components, and the reflective surface may be positioned over the grating. A cover may be configured to be attached to a base and to secure the grating and the reflective surface, and a housing may be configured to be coupled to the base. The base may be configured to be cooled in order to remove thermal energy. A boundary between the grating and the reflective surface may be serrated. Multiple optical fibers may be configured to provide the input optical beams, and at least one transform optic may be configured to direct the input optical beams from the optical fibers. An exit scraper may be configured to absorb one or more portions of the combined optical beam in order to generate an output beam. A boundary between the grating and the reflective surface may be shaped based on a desired far-field profile of an output beam.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

an optical surface configured to receive multiple input optical beams, the optical surface comprising:

a grating configured to diffract first portions of the input optical beams in a first direction to form a combined optical beam exclusively in the first direction, the grating also configured to reflect second portions of the input optical beams in a second direction, the first and second directions extending away from a common side of the optical surface; and a reflective surface at least partially surrounding the grating, the reflective surface configured to function as an apodizer to remove one or more unwanted portions of the input optical beams from the combined optical beam and to reflect third portions of the input optical beams in the second direction.

2. The apparatus of claim 1, wherein the optical surface is configured to receive the input optical beams arriving at different angles.

3. The apparatus of claim 1, wherein the grating and the reflective surface form an integral structure.

4. The apparatus of claim 1, wherein:

the grating and the reflective surface comprise separate components; and the reflective surface is positioned over the grating.

5. The apparatus of claim 1, further comprising:

a base;

a cover configured to be attached to the base and to secure the grating and the reflective surface; and a housing configured to be coupled to the base.

6. The apparatus of claim 5, wherein the base is configured to be cooled in order to remove thermal energy from the apparatus.

7. The apparatus of claim 1, wherein a boundary between the grating and the reflective surface is serrated.

8. The apparatus of claim 1, wherein a boundary between the grating and the reflective surface is shaped based on a desired far-field profile of an output beam.

9. A system comprising:

an optical device comprising an optical surface configured to receive multiple input optical beams, the optical surface comprising:

a grating configured to diffract first portions of the input optical beams in a first direction to form a combined optical beam exclusively in the first direction, the grating also configured to reflect second portions of the input optical beams in a second direction, the first and second directions extending away from a common side of the optical surface; and a reflective surface at least partially surrounding the grating, the reflective surface configured to function as an apodizer to remove one or more unwanted portions of the input optical beams from the combined optical beam and to reflect third portions of the input optical beams in the second direction; and a beam dump configured to terminate the second and third portions of the input optical beams.

10. The system of claim 9, wherein the optical surface is configured to receive the input optical beams arriving at different angles.

11. The system of claim 9, wherein the grating and the reflective surface form an integral structure.

12. The system of claim 9, wherein:

the grating and the reflective surface comprise separate components; and the reflective surface is positioned over the grating.

13. The system of claim 9, wherein the optical device further comprises:

a base;

a cover configured to be attached to the base and to secure the grating and the reflective surface; and a housing configured to be coupled to the base.

14. The system of claim 13, wherein the base is configured to be cooled in order to remove thermal energy from the optical device.

15. The system of claim 9, wherein a boundary between the grating and the reflective surface is serrated.

16. The system of claim 9, further comprising:

multiple optical fibers configured to provide the input optical beams; and at least one transform optic configured to direct the input optical beams from the optical fibers towards the optical device.

17. The system of claim 9, further comprising:

an exit scraper configured to absorb one or more portions of the combined optical beam in order to generate an output beam.

18. A method comprising:

receiving multiple input optical beams arriving at different angles at an optical surface;

using a grating of the optical surface, diffracting first portions of the input optical beams in a first direction to form a combined optical beam exclusively in the first direction and reflecting second portions of the input optical beams in a second direction, the first and second directions extending away from a common side of the optical surface; and using a reflective surface of the optical surface that at least partially surrounds the grating and that is configured to function as an apodizer, removing one or more unwanted portions of the input optical beams from the combined optical beam and reflecting third portions of the input optical beams in the second direction.

19. The method of claim 18, further comprising:

terminating the second and third portions of the input optical beams using a common beam dump.

20. The method of claim 18, wherein a boundary between the grating and the reflective surface is serrated.

* * * * *